US011634007B2

(12) United States Patent
Rodoni

(10) Patent No.: US 11,634,007 B2
(45) Date of Patent: Apr. 25, 2023

(54) SYSTEM IMPLEMENTING AIR QUALITY-BASED WASTE MANAGEMENT

(71) Applicant: Rubicon Technologies, LLC, Lexington, KY (US)

(72) Inventor: Philip Rodoni, Decatur, GA (US)

(73) Assignee: Rubicon Technologies, LLC., Lexington, KY (US)

( * ) Notice: Subject to any disclaimer, the term of this patent is extended or adjusted under 35 U.S.C. 154(b) by 361 days.

(21) Appl. No.: 17/087,548

(22) Filed: Nov. 2, 2020

(65) Prior Publication Data

US 2021/0114432 A1 Apr. 22, 2021

Related U.S. Application Data

(63) Continuation-in-part of application No. 15/678,919, filed on Aug. 16, 2017, now abandoned.

(51) Int. Cl.
| | |
|---|---|
| *B60H 1/00* | (2006.01) |
| *G06Q 10/00* | (2012.01) |
| *B60W 50/14* | (2020.01) |
| *G06Q 10/30* | (2023.01) |

(52) U.S. Cl.
CPC .......... *B60H 1/008* (2013.01); *B60W 50/14* (2013.01); *G06Q 10/30* (2013.01); *B60W 2050/143* (2013.01)

(58) Field of Classification Search
CPC ........ B60H 1/008; B60W 50/14; G06Q 10/30
See application file for complete search history.

(56) References Cited

U.S. PATENT DOCUMENTS

| | | | | |
|---|---|---|---|---|
| 7,330,128 | B1* | 2/2008 | Lombardo | B65F 3/00 340/471 |
| 11,373,536 | B1* | 6/2022 | Savchenko | G06Q 10/0639 |
| 2007/0243808 | A1* | 10/2007 | Mathur | B60H 3/0085 454/75 |
| 2011/0316689 | A1* | 12/2011 | Reyes | B65F 1/1484 340/532 |
| 2014/0379588 | A1* | 12/2014 | Gates | G06Q 10/0631 705/308 |
| 2016/0280160 | A1* | 9/2016 | MacNeille | G01C 21/3461 |
| 2017/0274737 | A1* | 9/2017 | Delaruelle | B60H 1/00985 |
| 2020/0198444 | A1* | 6/2020 | Schmidt | B60H 3/0035 |
| 2022/0185060 | A1* | 6/2022 | Feldman | B60H 1/0073 |

* cited by examiner

*Primary Examiner* — Sarah M Monfeldt
*Assistant Examiner* — Andrew Chase Lakhani
(74) *Attorney, Agent, or Firm* — Kilpatrick Townsend & Stockton, LLP; Michael Morlock

(57) ABSTRACT

A waste service management system, method, and computer program product improve waste services by responding to air quality that is outside and inside a waste service vehicle. A controller monitors at least one exterior air quality sensor that is mounted to, and exposed to air exterior to, the waste service vehicle. The controller monitors at least one interior air quality sensor that is mounted to the waste service vehicle and exposed to air interior to a waste hauling body that is one of carried and attached to the waste service vehicle. The controller compares measurement levels of exterior and interior airborne chemical constituents to one or more corresponding air quality thresholds. The controller presents a notification on a user interface device indicating any exceedance of the air quality threshold and an associated origin of one of the exterior air and the interior air.

17 Claims, 8 Drawing Sheets

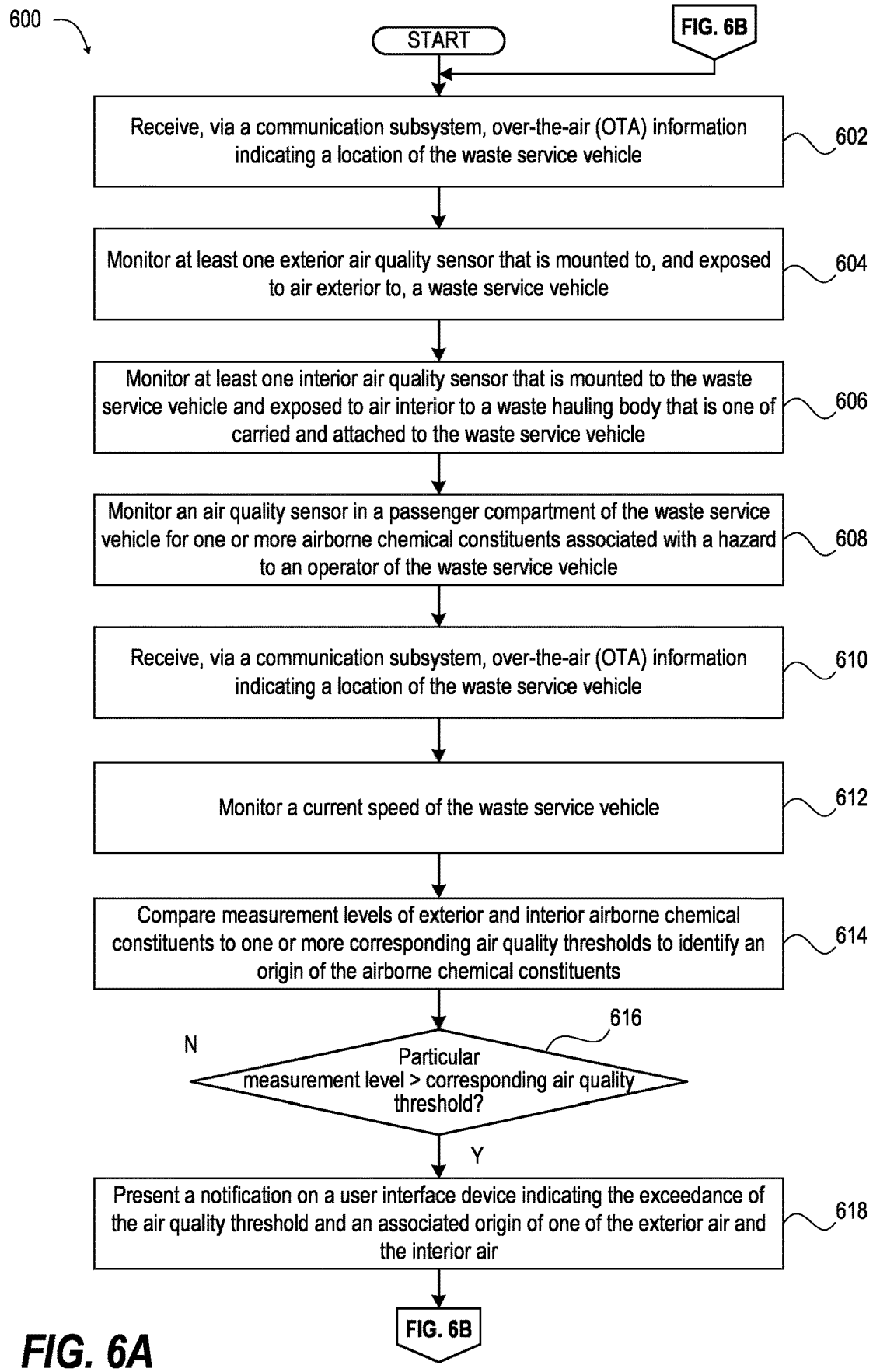

SYSTEM IMPLEMENTING AIR QUALITY-BASED WASTE MANAGEMENT

CLAIM OF PRIORITY UNDER 35 U.S.C. § 120

The present Application for Patent is a continuation-in-part of patent application Ser. No. 15/678,919 entitled "System Implementing Air Quality-Based Waste Management" filed 16 Aug. 2017, pending, and assigned to the assignee hereof and hereby expressly incorporated by reference herein.

TECHNICAL FIELD

The present disclosure relates generally to a waste management system and, more particularly, to a system implementing management of solid waste based on air quality.

BACKGROUND

In some applications of solid waste management, it can be important to know a mix of the solid waste collected by a service vehicle. For example, it can be important to know an amount (e.g., percent, weight, volume, etc.) of the collected waste that is recyclable, an amount of the collected waste that is compostable, and/or an amount of the collected waste that is hazardous. In some instances, this knowledge could be used to recommend ways to reduce, reuse, and/or sell portions of the waste in order for an associated customer to recoup some of the waste service cost. In other instances, the knowledge could be used to ensure compliance with governmental, municipal, or company regulations and safety standards.

Historically, a waste service representative (and/or the customer) would periodically observe the waste being dumped from a receptacle into a service vehicle and/or sift through waste inside the receptacle. The representative would then record information about the observed waste. For example, as a dumpster was lifted by a service vehicle and dumped into a bed of the vehicle, the representative would be on site to see the falling waste materials and record the materials as being cardboard, plastic, glass, biodegradable, compostable, and/or other. Alternatively, waste service representatives would be dispatched to physically evaluate the waste in one or more receptacles prior to service being performed to determine the mix and composition of waste materials in a receptacle. An analysis would then be performed based on the observations, and corresponding recommendations regarding how to best manage the solid waste would be made.

Although acceptable for some applications, these manual on-site audits may be less than optimal. In particular, these audits can be difficult, time-consuming, inaccurate, and potentially hazardous to the waste service representative. In addition, because of the difficulty and amount of time required for the audits, they may not be conducted frequently. As a result, the accuracy of the analysis and/or the benefit of the recommendation may be lower than desired for some applications.

The disclosed system is directed to overcoming one or more of the problems set forth above and/or other problems of the prior art. In some applications of solid waste management, it can be important to know a mix of the solid waste collected by a service vehicle. For example, it can be important to know an amount (e.g., percent, weight, volume, etc.) of the collected waste that is recyclable, an amount of the collected waste that is compostable, and/or an amount of the collected waste that is hazardous. In some instances, this knowledge could be used to recommend ways to reduce, reuse, and/or sell portions of the waste in order for an associated customer to recoup some of the waste service cost. In other instances, the knowledge could be used to ensure compliance with governmental, municipal, or company regulations and safety standards.

Historically, a waste service representative (and/or the customer) would periodically observe the waste being dumped from a receptacle into a service vehicle and/or sift through waste inside the receptacle. The representative would then record information about the observed waste. For example, as a dumpster was lifted by a service vehicle and dumped into a bed of the vehicle, the representative would be on site to see the falling waste materials and record the materials as being cardboard, plastic, glass, biodegradable, compostable, and/or other. Alternatively, waste service representatives would be dispatched to physically evaluate the waste in one or more receptacles prior to service being performed to determine the mix and composition of waste materials in a receptacle. An analysis would then be performed based on the observations, and corresponding recommendations regarding how to best manage the solid waste would be made.

Although acceptable for some applications, these manual on-site audits may be less than optimal. In particular, these audits can be difficult, time-consuming, inaccurate, and potentially hazardous to the waste service representative. In addition, because of the difficulty and amount of time required for the audits, they may not be conducted frequently. As a result, the accuracy of the analysis and/or the benefit of the recommendation may be lower than desired for some applications.

SUMMARY

In one aspect of the present disclosure, a waste service management system includes at least one exterior air quality sensor that detects a plurality of airborne chemical constituents and that is mounted to, and exposed to air exterior to, a waste service vehicle. The waste service management system includes at least one interior air quality sensor that detects a plurality of airborne chemical constituents and that is mounted to the waste service vehicle and exposed to air interior to a waste hauling body that is one of carried and attached to the waste service vehicle. The waste service management system includes a user interface display, a memory containing one or more air quality thresholds, and a controller. The controller is communicatively coupled to the at least one exterior air quality sensor, the at least one interior air quality sensor, the user interface device, and the memory. The controller monitors the at least one exterior air quality sensor for exterior airborne chemical constituents. The controller monitors the at least one interior air quality sensor for interior airborne chemical constituents. The controller compares measurement levels of the exterior and the interior airborne chemical constituents to the one or more corresponding air quality thresholds. In response to determining that a particular measurement level exceeds a corresponding air quality threshold, the controller presents a notification on the user interface device indicating the exceedance of the air quality threshold and an associated origin of one of the exterior air and the interior air.

In another aspect of the present disclosure, a method includes monitoring at least one exterior air quality sensor that is mounted to, and exposed to air exterior to, a waste service vehicle. The method includes monitoring at least one interior air quality sensor that is mounted to the waste service vehicle and exposed to air interior to a waste hauling body that is one of carried and attached to the waste service vehicle. The method includes comparing measurement levels of exterior and interior airborne chemical constituents to one or more corresponding air quality thresholds. The method includes, in response to determining that a particular measurement level exceeds a corresponding air quality threshold, presenting a notification on a user interface device indicating the exceedance of the air quality threshold and an associated origin of one of the exterior air and the interior air.

In an additional aspect of the present disclosure, a computer program product includes a computer readable storage device. Program code is on the computer readable storage device. When executed by a processor associated with a device, the program code enables the device to provide the functionality of monitoring at least one exterior air quality sensor that is mounted to, and exposed to air exterior to, a waste service vehicle. The functionality includes monitoring at least one interior air quality sensor that is mounted to the waste service vehicle and exposed to air interior to a waste hauling body that is one of carried and attached to the waste service vehicle. The functionality includes comparing measurement levels of exterior and interior airborne chemical constituents to one or more corresponding air quality thresholds. In response to determining that a particular measurement level exceeds a corresponding air quality threshold, the functionality includes: (i) identifying the associated origin of one of the exterior air and the interior air based on the corresponding one of the at least one exterior air quality sensor and the at least one interior air quality sensor having a highest measurement level for the particular airborne chemical constituent; and (ii) presenting a notification on a user interface device indicating the exceedance of the air quality threshold and an associated origin of one of the exterior air and the interior air.

These and other features are explained more fully in the embodiments illustrated below. It should be understood that in general the features of one embodiment also may be used in combination with features of another embodiment and that the embodiments are not intended to limit the scope of the invention.

BRIEF DESCRIPTION OF THE DRAWINGS

The various exemplary embodiments of the present invention, which will become more apparent as the description proceeds, are described in the following detailed description in conjunction with the accompanying drawings, in which:

FIGS. 6A-6B present a flow diagram of a method for providing reports and routing based on interior and exterior air quality to a waste service vehicle, according to one or more embodiments.

DETAILED DESCRIPTION

Figure 1:
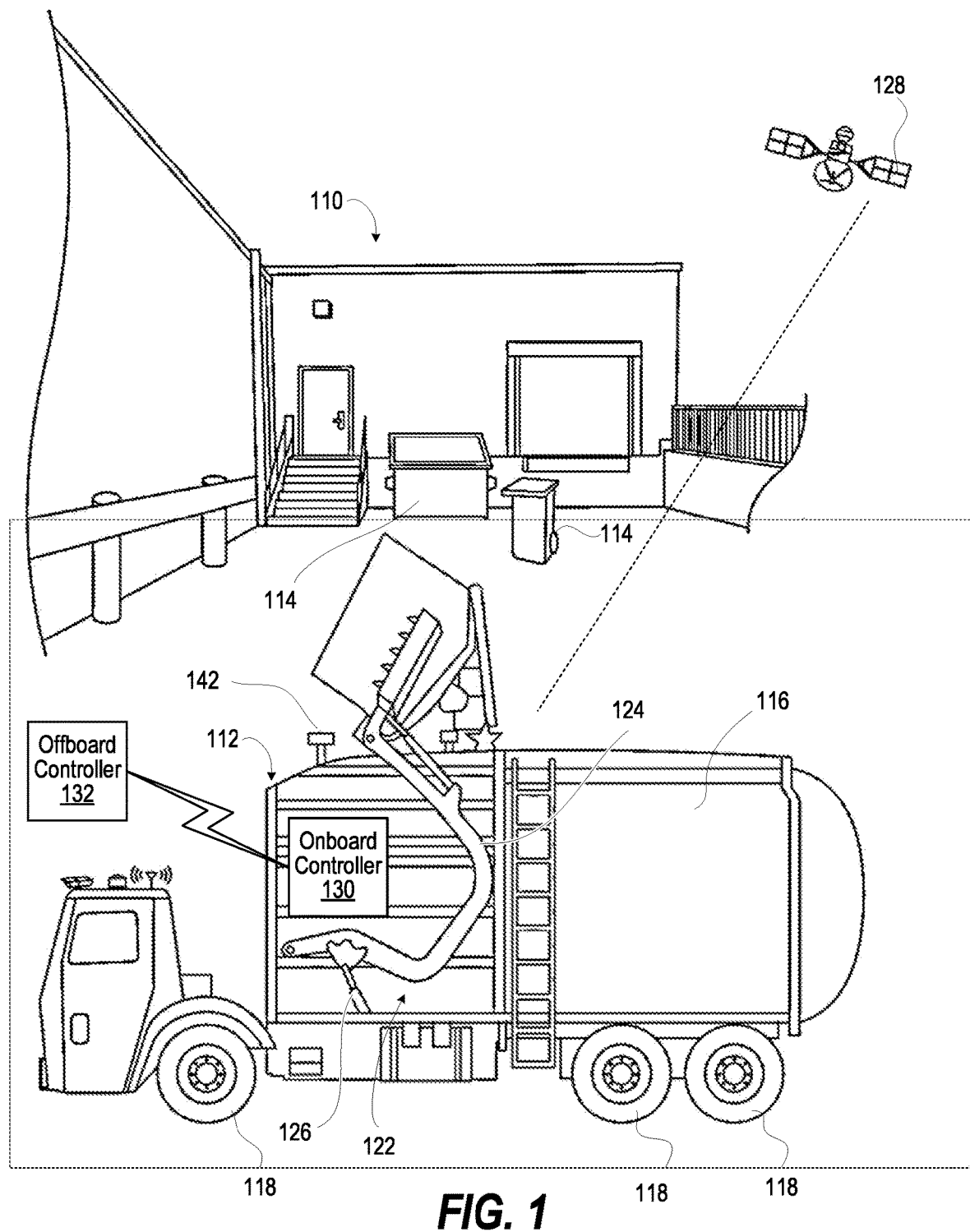
FIG. 1 depicts an isometric illustration of an exemplary disclosed waste management environment, according to one or more embodiments.

According to aspects of the present disclosure, a waste service management system, method, and computer program product improve waste services by responding to air quality that is outside and inside a waste service vehicle. A controller monitors at least one exterior air quality sensor that is mounted to, and exposed to air exterior to, the waste service vehicle. The controller monitors at least one interior air quality sensor that is mounted to the waste service vehicle and exposed to air interior to a waste hauling body that is one of carried and attached to the waste service vehicle. The controller compares measurement levels of exterior and interior airborne chemical constituents to one or more corresponding air quality thresholds. The controller presents a notification on a user interface device indicating any exceedance of the air quality threshold and an associated origin of one of the exterior air and the interior air.

In one aspect, the present disclosure is directed to a waste management system for use with a service vehicle. The waste management system may include a sensor configured to generate an air quality signal indicative of a quality of air in a vicinity of the service vehicle, a locating device configured to generate a location signal indicative of a location of the service vehicle, a display, and a controller in communication with the air quality sensor, the locating device, and the display. The controller may be configured to make a determination that the service vehicle is currently servicing a receptacle, and to selectively use the air quality signal to determine a mix of waste in the receptacle based on the determination. The controller may also be configured to, based on the location signal, cause a representation of the mix of the waste to be shown together with the location of the service vehicle on the display.

In another aspect, the present disclosure is directed to a method for managing waste retrieval by a service vehicle. The method may include sensing an air quality in a vicinity of the service vehicle, determining a location of the service vehicle, and making a determination that the service vehicle is currently servicing a receptacle. The method may also include selectively using the air quality to determine a mix of waste in the receptacle based on the determination and, based on the location of the service vehicle, displaying a representation of the mix of the waste together with the location of the service vehicle.

In yet another aspect, the present disclosure is directed to a non-transitory computer readable medium containing computer-executable programming instructions for a method of managing waste retrieval by a service vehicle. The method may include sensing an air quality in a vicinity of the service vehicle, determining a location of the service vehicle, and determining that the service vehicle is currently servicing a receptacle based on the location of the service vehicle. The method may also include using the air quality to determine a mix of waste in the receptacle only when the service vehicle is currently servicing the receptacle, and linking the air quality to the location of the service vehicle in an electronic map of the environment when the service vehicle is not currently servicing the receptacle. The method may further include selectively displaying at least one of the mix of the waste together with the location of the service vehicle or the electronic map.

FIG. 1 illustrates an exemplary waste management environment ("environment") 110, at which one or more service vehicles 112 are providing waste services. Environment 110 may include a retail store, a factory, a government building, a residential address, or another location having one or more receptacles 114 that require services of service vehicle 112. These services may include, for example, the retrieval of waste materials from inside of receptacle(s) 114, the replacement of receptacle(s) 114, and/or the placement of new or additional receptacles 114.

Service vehicle 112 may take many different forms. In the example shown in FIG. 1, service vehicle 112 is a hydraulically actuated, front-loading type of service vehicle. Specifically, service vehicle 112 may include a bed 116, a plurality of wheels 118, a cab 120 located forward of bed 116, and a lifting device 122 configured to pivot upward over a top of cab 120. Lifting device 122 may consist of, among other things, one or more lift arms 124 that engage and/or grasp receptacle 114, and one or more actuators 126 powered by pressurized oil to raise and/or tilt lift arms 124 (and receptacle 114) to a dump position over bed 116. After dumping of receptacle 114, pressurized oil may be released from hydraulic actuator(s) 126 to allow lowering of lift arms 124 and receptacle 114 back to the ground in front of service vehicle 112. In other examples, lifting device 122 may be located to pick up receptacles 114 from a side and/or a rear of service vehicle 112. In yet other examples, receptacles 114 may be manually lifted and dumped into bed 116.

As service vehicle 112 moves about environment 110, a satellite 128 or other tracking device may communicate with an onboard controller 130 to monitor the movements of service vehicle 112 and the associated changes made to environment 110 (e.g., pickup, dumping, placement, etc.). As will be explained in more detail below, onboard controller 130, or a separate offboard controller 132 (e.g., a controller 132 located in a back office 134 or other service facility—shown only in FIG. 2), may then manage future operations of service vehicle 112 (and other similar service vehicles 112) based on these movements and changes.

Both of onboard and offboard controllers 130, 132 may include means for monitoring, recording, storing, indexing, processing, communicating, and/or controlling other onboard and/or offboard devices. These means may include, for example, a memory, one or more data storage devices, a central processing unit, or any other components that may be used to run the disclosed application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, air quality media, CD ROM, or other forms of RAM or ROM.

Figure 2A:
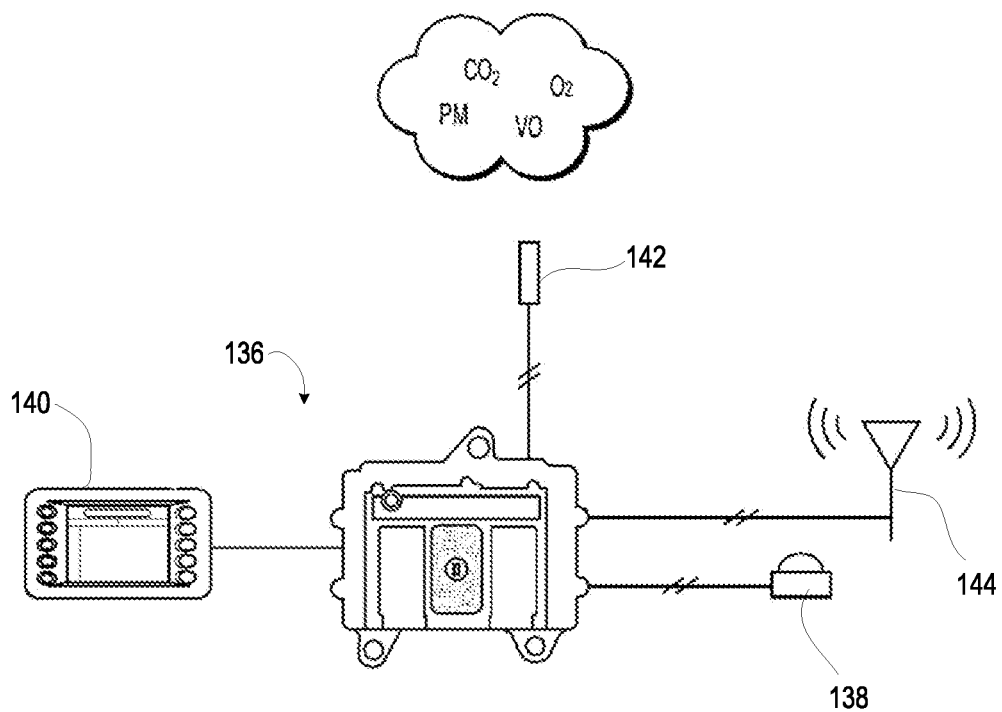
FIG. 2A depicts a diagrammatic illustration of an exemplary disclosed onboard system that may be used to manage the environment of FIG. 1, according to one or more embodiments.
Figure 2B:
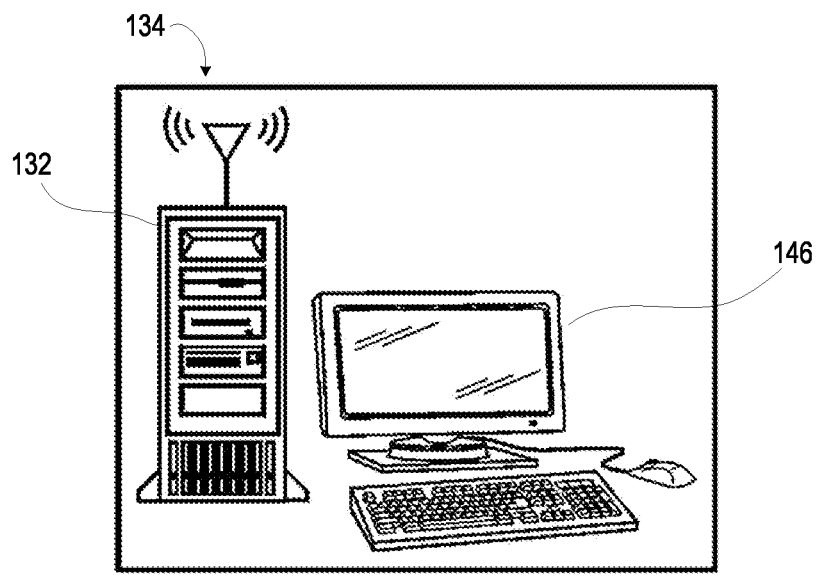
FIG. 2B depicts a diagrammatic illustration of an exemplary disclosed offboard system that may be used to manage the environment of FIG. 1, according to one or more embodiments.

FIG. 2A depicts a diagrammatic illustration of an exemplary disclosed onboard system (onboard controller) 130 that may be used to manage the environment of FIG. 1. FIG. 2B depicts a diagrammatic illustration of an exemplary disclosed offboard system (offboard controller) 132 that may be used to manage the environment of FIG. 1. As shown in FIG. 2A, onboard controller 130 may form a portion of a waste management system ("system") 136 that is configured to track, assist, and/or control movements of service vehicle 112 (shown only in FIG. 1). In addition to onboard controller 130, system 136 may also include a locating device 138, a user input device 140, and at least one air quality sensor 142. In some embodiments, controller 130, locating device 138, user input device 140 and/or sensor 142 may be integrally formed and/or packaged together in a handheld unit carried by the operator of service vehicle 112. Onboard controller 130 may be in communication with each of these other components and/or with offboard controller 132 at back office 134 (e.g., via a communication device 144) and configured to determine, based on signals from these components and based on other known information stored in memory, the location of the service vehicle 112, characteristics and locations of receptacles 114 being moved by and/or in a vicinity of each service vehicle 112, a quality of air in a vicinity of service vehicle 112, and/or a mix of waste retrieved by service vehicle 112 during a service activity.

Locating device 138 may be configured to generate signals indicative of a geographical position and/or orientation of service vehicle 112 relative to a local reference point, a coordinate system associated with environment 110, a coordinate system associated with Earth, or any other type of 2-D or 3-D coordinate system. For example, locating device 138 may embody an electronic receiver configured to communicate with satellites 128 (referring to FIG. 1), or a local radio or laser transmitting system used to determine a relative geographical location of itself. Locating device 138 may receive and analyze high-frequency, low-power radio or laser signals from multiple locations to triangulate a relative 3-D geographical position and orientation. In some embodiments, locating device 138 may also be configured to determine a location and/or orientation of a particular part of service vehicle 112, for example of lift arms 124 (shown only in FIG. 1). Based on the signals generated by locating device 138 and based on known kinematics of service vehicle 112, onboard controller 130 may be able to determine in real time, the position, heading, travel speed, acceleration, and orientation of service vehicle 112 and lift arms 124. This information may then be used by onboard and/or offboard controllers 130, 132 to update the locations and conditions of service vehicle(s) 112 and/or receptacles 114 in an electronic map or database of environment 110.

It is contemplated that locating device 138 may take another form and/or incorporate additional elements, if desired. For example, locating device 138 could be an RFID reader configured to interact with an RFID tag located within environment 110 (e.g., at a customer location, on receptacle 114, etc.), or another type of scanner configured to read another type of indicia (e.g., a barcode) within environment 110. Based on the reading of the RFID tag or other indicia, the location and/or orientation of service vehicle 112 may be linked to the known location of the RFID tag or other indicia within environment 110.

User input device 140 may provide a way for an operator of service vehicle 112 to input information regarding observances made while traveling around environment 110. For example, the operator may be able to enter a type and/or condition of waste observed at a particular location, an amount of waste in or around receptacle 114, a fill status of a particular receptacle 114, a condition of receptacle 114, a location of receptacle 114, and/or other information about the receptacle and waste engaged by, loaded into, or otherwise processed by service vehicle 112. The information may be input in any number of ways, for example via a cab-mounted touch screen interface, via one or more buttons, via a keyboard, via speech recognition, via a mobile device (e.g., a smartphone or tablet) carried by the operator, or in another manner known in the art. In some embodiments, the operator may also be able to respond to inquiries received via input device 140, if desired. In addition to receiving manual input from an operator, input device 140 may also be capable of displaying information, for example the electronic map of environment 110, instructions from back office 134, scheduling, receptacle information (e.g., ID, configuration, location, weight, etc.), payload information (e.g., weight and/or volume), questions, waste audit information, etc.

In some embodiments, input device 140 may be configured to execute an application. For example, when input device 140 is a mobile device (for example an integral component of a smartphone), the application can be a mobile app ("app"). The app can provide a graphical user interface (GUI) that displays information about a waste handling operation to an operator of service vehicle 112; and that receives input from the operator used to configure acquisition of air quality data by sensor 142, to transmit the air quality data to controllers 130, 132 via communication device 144, to receive and display information about a current operation, etc.

Any number of air quality sensors 142 may be mounted at any location suitable for capturing air quality data associated with waste falling from receptacle 114 into bed 116 while lifting device 122 is in its upper-most and tilted position. In one example, air quality sensor(s) 142 are mounted onboard vehicle 112 and positioned around a perimeter of an access opening in bed 116 (e.g., at a leading end, a trailing end, a side, etc.—see FIG. 1) and oriented toward a center of the access opening. In another example, air quality sensor(s) 142 are mounted on receptacle 114 and positioned around a perimeter of an access opening into receptacle 114. In yet another example, air quality sensor(s) 142 are mounted at a customer location, but not on vehicle 112 or receptacle 114. For example, air quality sensor(s) 142 may be mounted to a fence, a wall, a roof, a light pole, or another structure at the receptacle location. It is contemplated that air quality sensor(s) 142 mounted on receptacle 114 or at a customer location may be configured to capture and store air quality readings at times other than when service is being performed. Air quality sensor(s) 142 mounted on receptacle 114 or in other locations at a customer location may be configured to transmit stored readings to controllers 130, 132 via a communication device 144. Controllers 130, 132 may then analyze the air quality data collected prior to service being performed at a receptacle 114.

In another embodiment, air quality sensor(s) 142 may be installed throughout environment 110. Air quality sensor(s) 142 may be configured to intermittently or continuously capture and store air quality readings of the environment 110 at the location where they are installed. These sensor(s) 142 may further be configured to transmit the stored air quality data to controller 130 when a service vehicle 112 is within an appropriate proximity to air quality sensor(s) 142.

It is contemplated that, in addition to capturing air quality data associated with a particular receptacle 114 (e.g., during lifting and/or dumping of receptacle 114) or a particular customer location, air quality sensor(s) 142 could additionally be positioned to capture air quality data during travel of service vehicle 112. For example, one or more air quality sensors(s) 142 may be mounted to service vehicle 112 at a location away from bed 116 (e.g., at a leading end of service vehicle 112, over cab 120), such that these sensor(s) 142 are not significantly affected by waste being dumped into and/or contained within bed 116. These sensor(s) 142 may then be used during travel of service vehicle 112 between service stops, between a service stop and a dump location, and/or during travel at the dump location. As will be explained in more detail below, this information may then be used to determine a geographical quality of air within an environment traversed by service vehicle 112.

In the disclosed embodiment, air quality sensor 142 is modular, self-contained, and only temporarily mounted to service vehicle 112. In this manner, air quality sensor 142 may be used only temporarily with a first service vehicle 112, and then removed and remounted to a second service vehicle 112. In other embodiments, however, air quality sensor 142 is permanently connected to service vehicle 112, receptacle 114, or at a customer location or otherwise in environment 110.

Each air quality sensor 142 may be configured to capture digital air quality data that can be viewed in real or near-real time and/or downloaded for later viewing. For example, air quality sensor 142 may be an infrared radiation sensor, an electrochemical sensor, an electroacoustic sensor, or another type of sensor commonly used to generate signals indicative of an amount of carbon dioxide, methane, ammonia, sulfides, and/or other potentially harmful pollutants in the air. These sensors may measure an attenuation of light, sound, or another variable within a given environment caused by the pollution and generate a corresponding digital output that is indicative of a concentration of a particular chemical constituent. The digital output may then be stored as data within an internal memory of sensor 142, communicated to onboard controller 130 (e.g., via Bluetooth), and/or communicated to offboard controller 132 via wired or wireless technology. In some instances, the digitized data may be streamed via Bluetooth to controller 130, which may then store the data for later download and/or relay the data to offboard controller 132 via communication device 144. As will be explained in more detail below, corresponding air quality information may be shown on a display 146 at back office 134 and viewed by a human operator.

Onboard controller 130 may be configured to manage communications between other onboard components and offboard controller 132 located at back office 134. For example, onboard controller 130 may receive signals from locating device 138, input device(s) 140, and air quality sensor(s) 142, and correlate the signals, filter the signals, buffer the signals, record the signals, or otherwise condition the signals before directing the signals offboard via communication device 144.

Communication device 144 may be configured to facilitate communication between onboard controller 130 and offboard controller 132. Communication device 144 may include hardware and/or software that enable the sending and/or receiving of data messages through a communications link. The communications link may include satellite, cellular, infrared, radio, and any other type of wireless communications. Alternatively, the communications link may include electrical, optical, acoustical, or any other type of wired communications, if desired. In one embodiment, onboard controller 130 may be omitted, and offboard controller 132 may communicate directly with locating device 138, input device(s) 140, and/or air quality sensor(s) 142, via communication device 144, if desired. Other means of communication may also be possible.

Onboard and/or offboard controllers 130, 132, based on the information received from onboard service vehicles 112 and also based on information received from other sources (e.g., from the Internet, from input at back office 134, from the operator of service vehicle 112, etc.), can be configured to execute instructions stored on computer readable medium to perform methods of waste management at environment 110. For example, onboard and/or offboard controllers 130, 132 may be configured to determine a mix of different types of materials (e.g., recyclables such as cardboard, plastic, glass, metal; biodegradables; hazardous materials; etc.) within the waste collected by service vehicle 112 while at known service stops, and also to determine a general air quality of the environment during travel between service stops. Determination of the waste mix may include, for example, determination of an amount, a volume, a weight, a ratio, a value, a quality, a source, a destination, or another measure of one or more of the different types of materials included in the collected waste. In addition, onboard and/or offboard controllers 130, 132 may be configured to provide recommendations and/or alerts based on the mix, such as how to reduce the waste, how to reduce a cost of the waste service, where to transport the waste, the presence of hazardous waste materials, applicable governmental or company regulations or policies, etc. An exemplary waste management process 300 is illustrated in FIG. 3 and will be explained in more detail in the following section to further illustrate the disclosed concepts.

INDUSTRIAL APPLICABILITY

The disclosed system may be applicable to the waste service industry, where knowledge of air quality can affect efficiency, profitability, safety, and environmental health. The disclosed system may be able to determine a quality of air within a moving environment around service vehicle 112. The disclosed system may also be able to relate the air quality to an amount, type, quality, and/or mix of waste collected by and/or in a vicinity of service vehicle 112. Air quality data and the related waste information may then be displayed (e.g., onboard service vehicle 112 and/or offboard at back office 134) for use in managing solid waste. In some embodiments, the disclosed system may also be able to alert a customer regarding the waste information and/or to provide recommendations based on the waste information, such that waste-handling processes may be adjusted to reduce waste service costs and/or to improve general air quality. Operation of system 136 will now be described with reference to FIG. 3.

Figure 3:
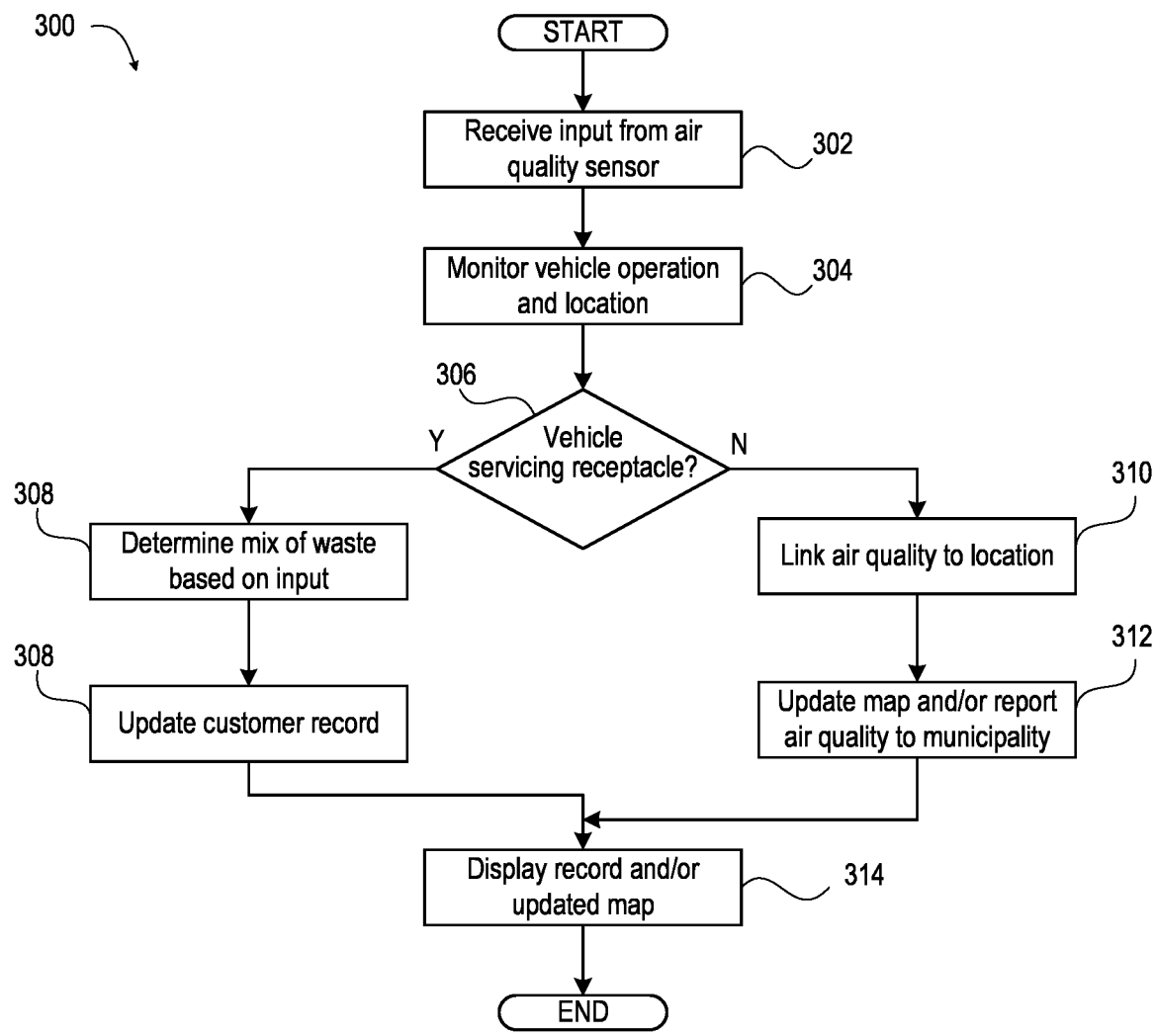
FIG. 3 depicts a flowchart depicting an exemplary disclosed method that may be performed by the system of FIG. 2, according to one or more embodiments.

As shown in FIG. 3, method 300 may begin with the monitoring of air quality around service vehicle 112 (block 302) and the location of service vehicle 112 (block 304). In particular, as service vehicle 112 moves about environment 110 (referring to FIG. 1), the air quality may be monitored via sensor(s) 142 (referring to FIG. 2) and the location of service vehicle 112 may be monitored via locating device 138. Input indicative of the air quality and the location may be provided by sensor(s) 142 and locating device 138, respectively, to onboard controller 130 (and/or to offboard controller 132, via communication device 144) for further processing. It should be noted that Steps 1310 and 1320 may be completed in any order, at the same time, and/or continuously during service vehicle operation.

Controller 130 may determine if service vehicle 112 is currently servicing a receptacle 114 (block 306). This determination may be made based, at least in part, on the tracked location of service vehicle 112. For example, when a current location of service vehicle 112 (as provided by locating device 138) corresponds (e.g., within a threshold distance) with a known service stop or location of a particular receptacle 114, controller 130 may consider servicing of the particular receptacle 114 to be underway. In some embodiments, additional information (e.g., lift arm movement, vehicle travel speed, operator input, receptacle identification, etc.) available from onboard service vehicle 112 may be used in conjunction with the location information to make this determination, if desired.

The air quality data generated by sensor(s) 142 at block 302 may be used in different ways, depending on when and/or where the data is generated. For example, when controller 132 determines at block 306 that service vehicle 112 is currently servicing receptacle 114, controller 132 may use the air quality data to determine information associated with (e.g., an amount, type, mix, and/or quality of) any waste being collected from the corresponding receptacle 114 (block 308). That is, the air quality detected by sensor(s) 142 during receptacle servicing may be primarily due to the amount, type, mix, and/or quality of waste present in receptacle 114. Accordingly, controller 130 may be configured to automatically determine the waste-related information based on machine learning and in association with recognition patterns contained within one or more algorithms, equations, graphs, maps, and/or tables stored in memory. For example, controller 130 may be taught to recognize patterns of chemical constituents detected together, amounts of particular constituents detected at the same time, detection frequencies of constituents, and/or orders of constituents detected by sensor(s) 142 during the dumping of waste material into bed 116 of service vehicle 112, and to correlate the patterns to the amount, type, mix, and/or quality of the waste in the immediate vicinity of sensor(s) 142 (i.e., with the waste collected from receptacle 114 at the current service stop). Corresponding customer records (i.e., records of the customer responsible for the receptacle 114 from which the corresponding waste is being collected) may then be updated by controller 130 with the waste-related information determined at block 308 (block 310).

However, when controller 130 determines at block 306 that service vehicle 112 is not currently servicing a receptacle 114, the air quality data generated by sensor(s) 142 at block 302 may simply be linked to a current location of service vehicle 112 (block 312). That is, because no receptacles 114 are being serviced at the time that the air quality data is being generated, solid waste may not necessarily be affecting the air quality. Alternatively, controller 130 may be configured to make a determination based on data collected at the time of service, which may then be used to normalize or tare subsequent sensor readings. Accordingly, the air quality could instead be related to other factors of the environment (e.g., a nearby park, a nearby factory, a body of water, etc.), and controller 130 may simply use the air quality data together with the location information to update a map of the environment stored in memory (block 314). In addition, in some embodiments, the location-linked air quality data may be provided to a local municipality, company, or other institution (e.g., via communication device 144), allowing the local municipality to analyze and/or address any associated air quality issues.

In a further embodiment, it is contemplated that controller 132 may be used to coordinate or route one or more service vehicle(s) 112 to strategically map the air quality in certain locations and within a desired schedule. For example, a dispatch operator at back office 134 could route one or more service vehicles 112 equipped with air quality sensors 142 to travel along desired and/or optimal routes. The controller 130 and air quality sensor(s) 142 of service vehicle(s) 112 may then collect and store air quality data while traveling along the specified route. By way of a further example, controller 132 may be configured to automatically route service vehicle(s) 112 to collect desired air quality information. Additionally, in the event that a municipality receives an alert indicating the possibility of a potentially hazardous situation (e.g. a gas leak, sewage leak, material spill, etc.), controller 132 may be used to route one or more service vehicle(s) 112 equipped with air quality sensor(s) 142 to gather air quality data in a reported or suspected vicinity to further determine the existence of the hazard based on air quality readings. Because service vehicle(s) 112 regularly perform waste services throughout environment 110, service vehicle(s) 112 may be routed to the location of a reported or suspected hazard, providing air quality data that may assist a municipality to evaluate and determine an appropriate response.

After completion of blocks 310 and/or 314, controller 130 may cause related information to be displayed (block 316). For example, the air quality data, the location information, the customer record, and/or the updated map of the environment may be shown onboard vehicle 112 (e.g., via device 140) and/or offboard vehicle 112 (e.g., via display 146 at back office 134). The information may be communicated to offboard controller 132 in any number of different ways. For example, the information could be streamed in real or near-real time from onboard controller 130 to offboard controller 132 via communication device 144. Alternatively, onboard controller 130 may record the information into memory for later download to offboard controller 132.

In some embodiments, the customer whose records have been updated at block 310 may be alerted and/or provided with recommendations regarding the handling of solid waste. The alert may be in the form of a paper and/or electronic communication, and include text and graphics that illustrate a ratio, a volume, and/or a weight of each category of waste material recognized in the mix. The recommendation may include ways in which the customer may reduce waste flow (e.g., by removing cardboard that makes up a substantial portion of the waste, collecting biodegradables separately, etc.) and/or offset waste service costs (e.g., by recycling, by amassing particular materials before disposal or recycling, etc.). The alert and/or recommendation may be generated automatically by onboard controller 130 (and/or offboard controller 132) for a particular customer (e.g., by linking signals from locating device 138 with the air quality data and the corresponding mix determinations) and/or manually.

In some embodiments, the operation of service vehicle 112 may be selectively adjusted based on the mix of waste determined at block 310 and/or the map updated at block 314. In particular, a schedule of service vehicle 112 may be adjusted in real-time based on the determined mix of waste just deposited into bed 116. For example, if it is determined that a large enough amount of the collected waste is recyclable or compostable, instead of dispatching service vehicle 112 to a landfill, it may make more sense financially to dispatch service vehicle 112 to a sorting and/or recycling center. This live scheduling adjustment may increase a profitability of the customer and/or the service provider, while simultaneously reducing a footprint on the environment. Similarly, based on the air quality of particular areas traversed by service vehicle 112, a route of service vehicle 112 may be selectively adjusted to reduce pollution contributions to and/or to avoid highly-polluted areas of the map.

It will be apparent to those skilled in the art that various modifications and variations can be made to the disclosed system. Other embodiments will be apparent to those skilled in the art from consideration of the specification and practice of the disclosed system. For example, although system 136 (including sensor(s) 142) have been described as being used in conjunction with a land-based vehicle, it is complicated that system 136 could additionally or alternatively be used with an air-based vehicle (e.g., a drone), a water-based vehicle, or another type of vehicle, if desired. It is intended that the specification and examples be considered as exemplary only, with a true scope being indicated by the following claims and their equivalents.

Figure 4:
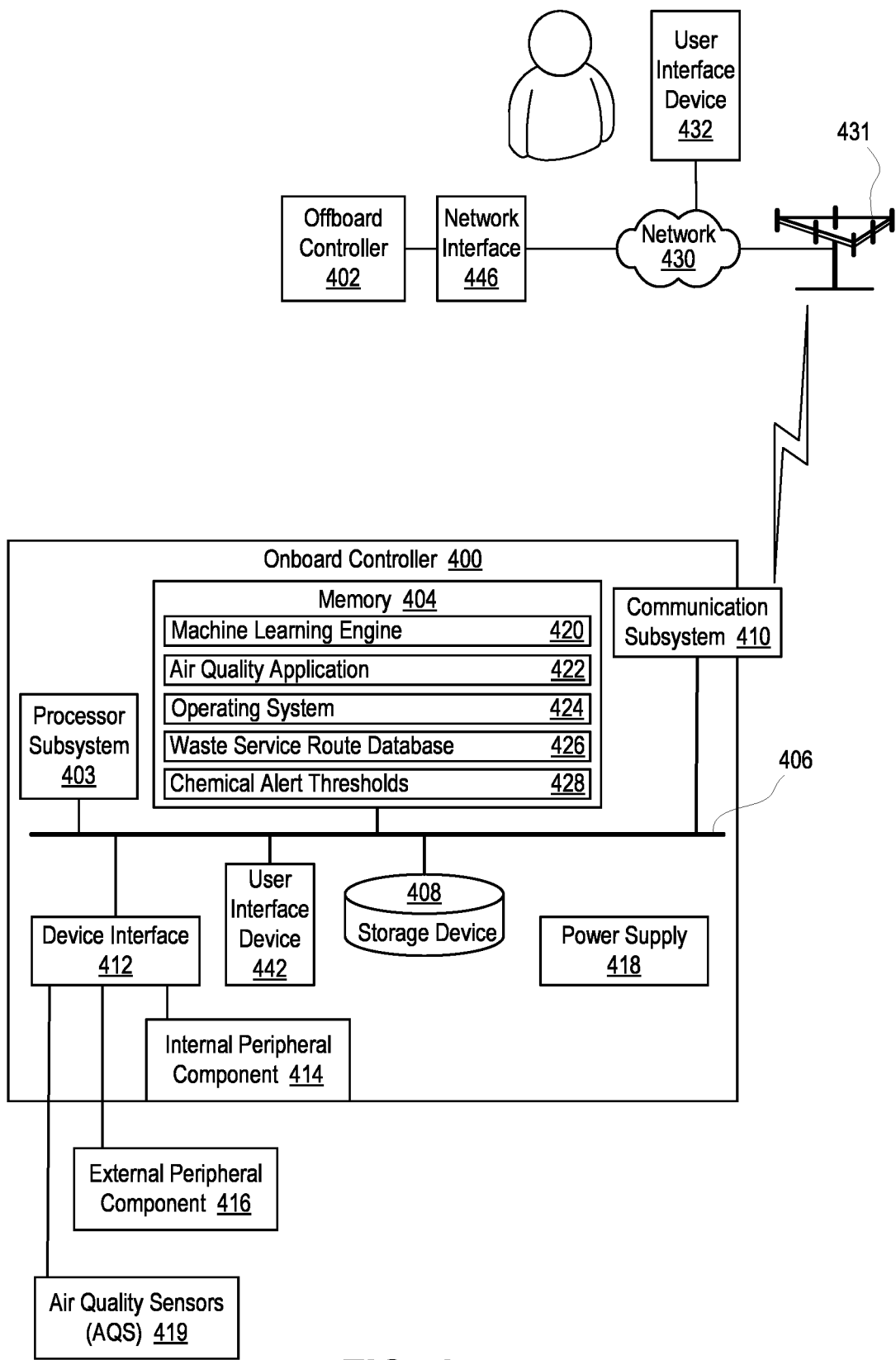
FIG. 4 depicts a functional block diagram of a waste service management system that is managed by one or more customized computing device ("controllers"), according to one or more embodiments.

FIG. 4 depicts a functional block diagram of a waste service management system 400 that is managed by one or more customized computing device ("controllers"). For clarity, an onboard controller 401 is described in detail. In one or more embodiments, components and functions described below for the onboard controller 401 are performed at least in part by an offboard controller 402. In one or more embodiments, substantially all of the functions are performed by the offboard controller 402. For clarity, onboard controller 401 is depicted as a unitary component; however, onboard controller 401 can have a distributed architecture of communicatively coupled components that are physically separated. For purposes of this disclosure, onboard controller 401 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, programmable logic controller (PLC), field programmable gate array (FPGA), a network storage device, or any other suitable device and may vary in size, shape, performance, functionality, and price. The information handling system may include random access memory (RAM), one or more processing resources such as central processing units (CPUs), tensor processing units (TPUs), or hardware or software control logic, ROM, and/or other types of nonvolatile memory. Additional components of the information handling system may include one or more disk drives, one or more network ports for communicating with external devices as well as various input and output (I/O) devices.

In a particular embodiment, onboard controller 401 includes processor subsystem ("processor") 403, memory 404 communicatively coupled to processor subsystem 403 via interlink 406, storage device 408, a communication subsystem 410 communicatively coupled to processor subsystem 403, device interface 412 coupled to internal and external peripheral devices 414, 416, respectively, and power supply 418 electrically coupled to processor subsystem 402. External peripheral devices 414 can include air quality sensors 419. System interconnect 406 can be interchangeably referred to as a system bus, in one or more embodiments. System interconnect 406 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Processor subsystem 403 may include any system, device, or apparatus configured to interpret and/or execute program instructions and/or process data, and may include, without limitation a microprocessor, microcontroller, digital signal processor (DSP), Application Specific Integrated Circuit (ASIC), or any other digital or analog circuitry configured to interpret and/or execute program instructions and/or process data such as machine learning engine 420, an air quality application 422, operating system 424, waste service route database 426, and computer data such as airborne chemical constituent threshold lookup table (LUT) 428. In some embodiments, processor 402 may interpret and/or execute program instructions and/or process data stored in memory 404 and/or another component of onboard controller 401. Memory 404 may be communicatively coupled to processor subsystem 403 and may include any system, device, or apparatus configured to retain program instructions and/or data for a period of time (e.g., computer-readable media). By way of example without limitation, memory 404 may include RAM, EEPROM, a PCMCIA card, flash memory, magnetic storage, opto-magnetic storage, or any suitable selection and/or array of volatile or non-volatile memory that retains data after power to onboard controller 401 is turned off or power to onboard controller 401 is removed. Communication subsystem 410 may include any suitable system, apparatus, or device operable to serve as an interface between onboard controller 401 and network 430 via a radio access network (RAN) 431. Communication subsystem 410 may enable onboard controller 401 to communicate over network 430 to user interface device(s) 432 and other remote entities such as offboard controller 402. Waste service management system 400 can provide routing, prompts and reports to a person 440 via the user interface device 432 The network 430 can use any suitable transmission protocol and/or standard, including without limitation all transmission protocols and/or standards enumerated herein with respect to the discussion of network 430. Offboard controller 402 can participate in or manage the processing and notifications via a network interface 446 that is communicatively coupled to onboard controller 401 via network 430. In one or more embodiments, waste service management system 400 can provide routing, prompts and reports to a person 440 such as an operator of a waste service vehicle via a user interface device 442 that is communicatively coupled to processor subsystem 403 via interlink 406. For example, user interface device 442 can be mounted to a dashboard of the waste serve vehicle.

Figure 5:
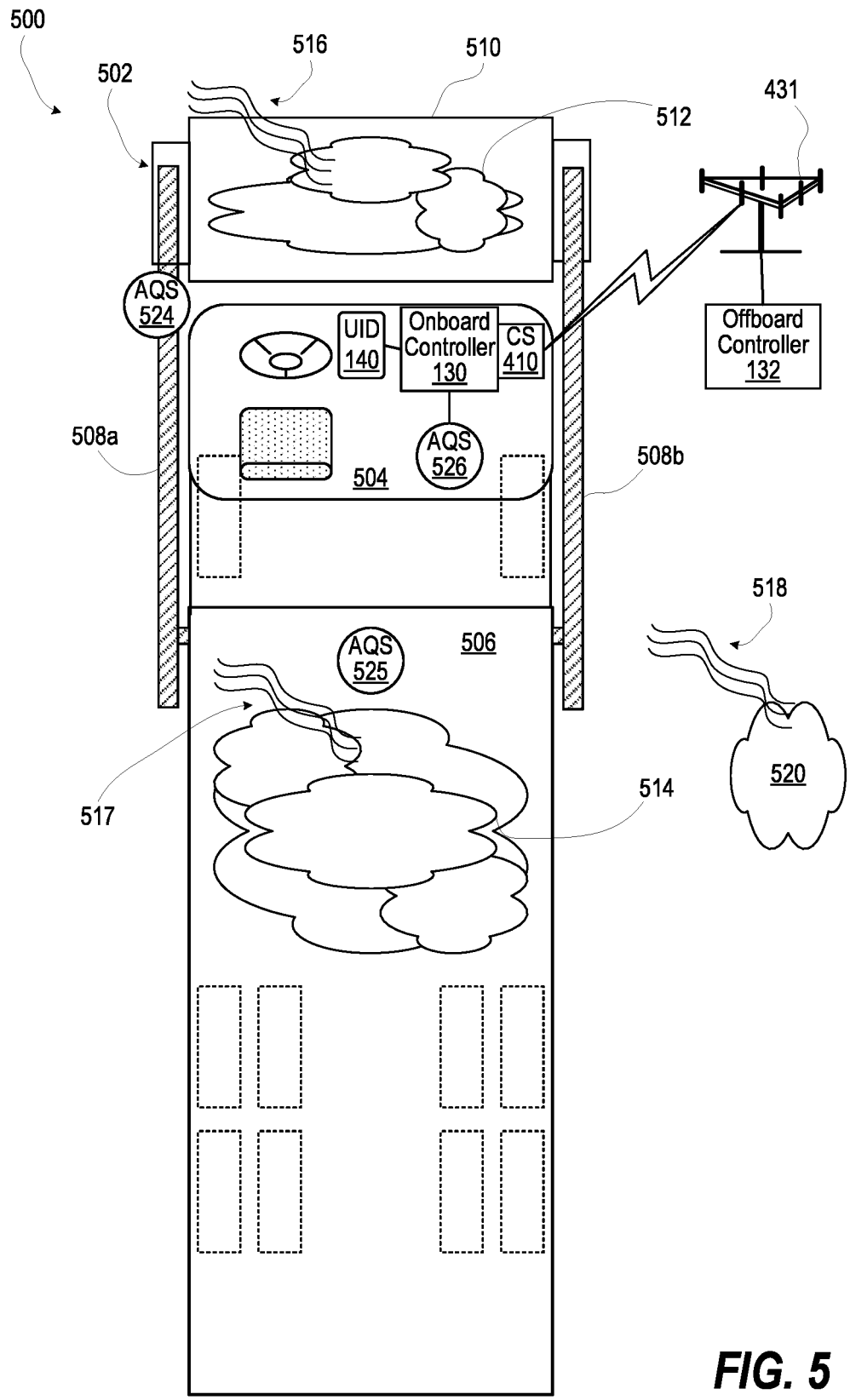
FIG. 5 is a diagram of a waste service management system carried at least in part on a front loading waste service vehicle 502 for prompts and routing based on air quality, according to one or more embodiments.

FIG. 5 is a diagram of a waste service management system 500 that is incorporated at least in part on a front loading waste service vehicle 502 for providing prompts and routing based on air quality. The waste service vehicle 502 includes a passenger compartment 504 and waste hauling bed or body 506. Lift arms 508a-508b can load a waste receptacle 510 on the waste hauling bed or body 506 or dump contents 512 of the waste receptacle 510 into the waste hauling bed or body 506 along with other contents 514. In one or more embodiments, lift arm(s) can operate on one lateral side or a rear side of the waste hauling bed or body 506.

Contents 512 of the waste receptacle 510 can release airborne chemical constituents 516. Contents 514 of waste hauling bed or body 506 can release airborne chemical constituents 517. Environmental hazards 520 that are outside of the waste receptacle 510 and the waste service vehicle 502 can release airborne chemical constituents 518. Response by the waste service management system 500 as managed by a controller, such as onboard controller 130 and/or offboard controller 132 is appropriate to the source, nature, and level of airborne chemical constituents, 516-518 by having air quality sensors 524-526 that can discriminate these characteristics. For example, air quality sensor 524 can be positioned on an exterior of waste service vehicle 502, such as on a lift arm 508a that can detect outside air quality near the waste receptacle 510. When moving, air quality sensor 524 can detect air quality of the ambient environment that is not affected by contents 512 of the waste receptacle 510 or contents 514 of the waste hauling bed or body 506. Air quality sensor 525 can be positioned inside of the waste hauling bed or body 506. Identifying airborne chemical constituents, 517 enables redirecting delivery of contents 514 to a waste destination that is appropriate for the contents 514. For example, detecting strong concentrations of organic garbage can indicate that a sanitary landfill is appropriate. For another example, detecting odors consistent with recyclable materials can indicate that a recycling center is appropriate. For another example, detecting strong concentrations of toxic, flammable, or otherwise hazardous chemical constituents can indicate a hazardous waste handling facility. The ability to discriminate internally originating airborne chemical constituents 516 or waste receptacle originating airborne chemical constituents 517 provides an opportunity for the waste service management system 500 to be a community monitoring capability for environmental hazards of airborne chemical constituents 518 that arise that are unrelated to waste services.

Figure 6B:
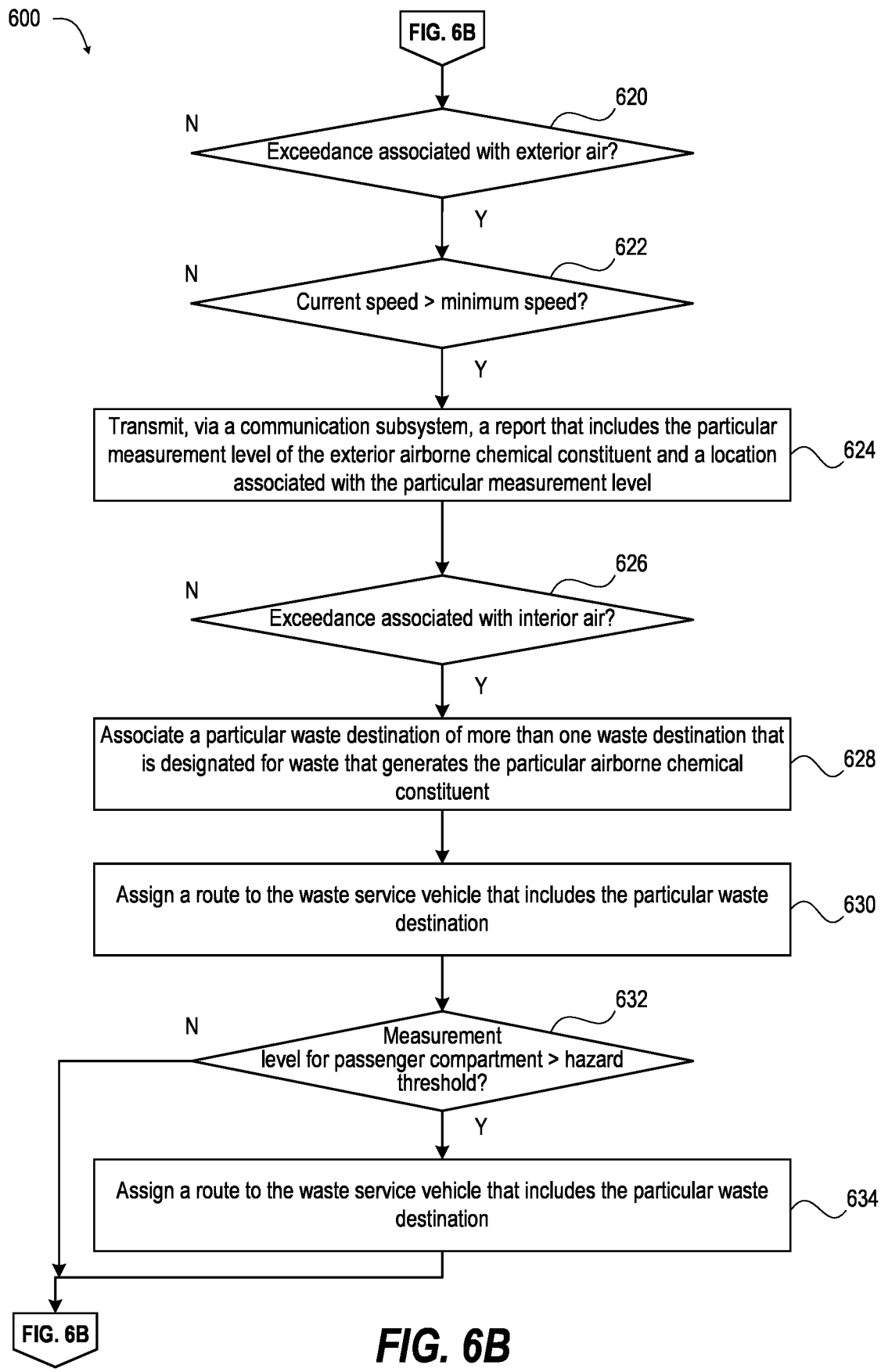

FIGS. 6A-6B present a flow diagram of method 600 for providing reports and routing based on interior and exterior air quality to a waste service vehicle. In one or more embodiments, method 600 is performed by components described for FIGS. 1-5. With initial reference to FIG. 6A, method 600 includes receiving, via a communication subsystem, over-the-air (OTA) information indicating a location of the waste service vehicle (block 602). Method 600 includes monitoring at least one exterior air quality sensor that is mounted to, and exposed to air exterior to, a waste service vehicle (block 604). Method 600 includes monitoring at least one interior air quality sensor that is mounted to the waste service vehicle and exposed to air interior to a waste hauling body that is one of carried and attached to the waste service vehicle (block 606). Method 600 includes monitoring an air quality sensor in a passenger compartment of the waste service vehicle for one or more airborne chemical constituents associated with a hazard to an operator of the waste service vehicle (block 608). Method 600 includes receiving, via a communication subsystem, over-the-air (OTA) information indicating a location of the waste service vehicle (block 610). Method 600 includes monitoring a current speed of the waste service vehicle (block 612). Method 600 includes comparing measurement levels of exterior and interior airborne chemical constituents to one or more corresponding air quality thresholds to identify an origin of the airborne chemical constituents (block 614). Method 600 including determining whether a particular measurement level exceeds a corresponding air quality threshold (decision block 616). In response to no particular measurement level exceeding the corresponding air quality threshold, method 600 returns to block 602. In response to a particular measurement level exceeding the corresponding measurement level, method 600 includes presenting a notification on a user interface device indicating the exceedance of the air quality threshold and an associated origin of one of the exterior air and the interior air (block 618).

In one or more embodiments, with reference to FIG. 6B, method 600 includes determining whether the exceedance is associated with the exterior air (decision block 620). In response to the exceedance being associated with the exterior air, method 600 further includes determining whether the current speed is greater than a minimum speed to mitigate cross flow of interior air with exterior air (decision block 622). In response to determining that the current speed is greater than the minimum speed, method 600 includes transmitting, via a communication subsystem, a report that includes the particular measurement level of the exterior airborne chemical constituent and a location associated with the particular measurement level (block 624).

In response to determining that the exceedance is not associated with the exterior air in decision block 620, or in response to determining that the current speed is not greater than the minimum speed, or after block 624, method 600 includes determining whether the exceedance is associated with the internal air (decision block 626). In response to determining the exceedance is associated with the internal air, method 600 includes associating a particular waste destination of more than one waste destination that is designated for waste that generates the particular airborne chemical constituent (block 628). Method 600 includes assigning a route to the waste service vehicle that includes the particular waste destination (block 630).

In response to determining that the exceedance is not associated with the internal air in decision block 626 or after block 630, method 600 includes determining whether at least one of the one measurement level for the passenger compartment exceeds a corresponding hazard threshold (decision block 632). In response to determining that the at least one of the one measurement level for the passenger compartment does not exceed a corresponding hazard threshold, method 600 returns to block 602 (FIG. 6A). In response to determining that the at least one of the one measurement level for the passenger compartment exceeds a corresponding hazard threshold, method 600 includes presenting a hazard notification on the user interface device (decision block 634). Then method 600 returns to block 602 (FIG. 6A).

Figure 7:
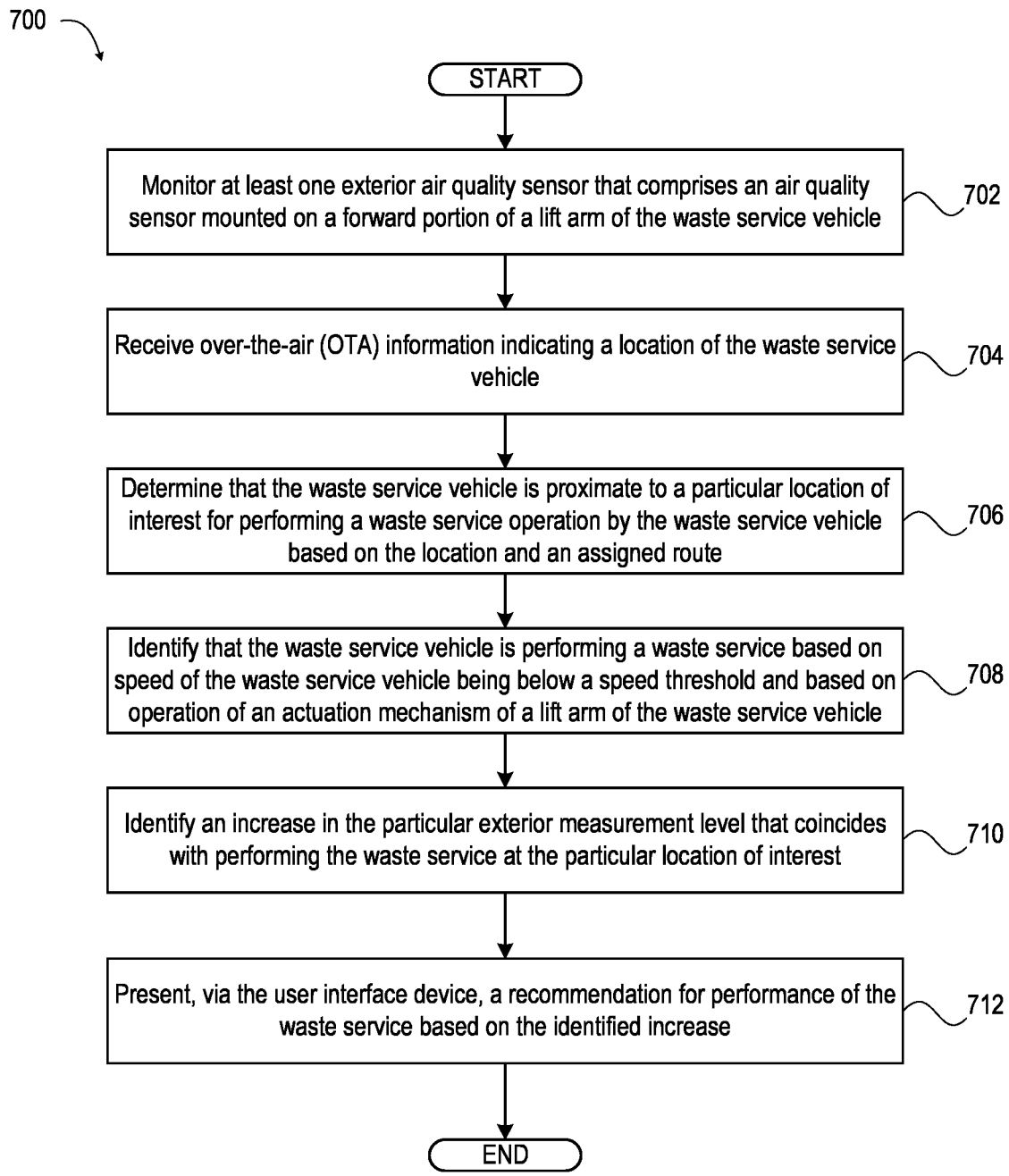
FIG. 7 presents a flow diagram of a method for detecting airborne chemical constituents that originate from a waste receptacle during a waste service by a waste service vehicle, according to one or more embodiments.

FIG. 7 presents a flow diagram of method 700 for detecting airborne chemical constituents that originate from a waste receptacle during a waste service by a waste service vehicle. Method 700 includes monitoring at least one exterior air quality sensor that comprises an air quality sensor mounted on a forward portion of a lift arm of the waste service vehicle (block 702). The lift arm lifts a waste receptacle and one: (i) loads and unloads the waste receptacle on a bed of the waste service vehicle; and (ii) dumps contents of the waste receptacle in a waste hauling body of the waste service vehicle. Method 700 includes receiving over-the-air (OTA) information indicating a location of the waste service vehicle (block 704). Method 700 includes determining that the waste service vehicle is proximate to a particular location of interest for performing a waste service operation by the waste service vehicle based on the location and an assigned route (block 706). Method 700 includes identifying that the waste service vehicle is performing a waste service based on speed of the waste service vehicle being below a speed threshold and based on operation of an actuation mechanism of a lift arm of the waste service vehicle (block 708). Method 700 includes identifying an increase in the particular exterior measurement level that coincides with performing the waste service at the particular location of interest (block 710). Method 700 includes presenting, via the user interface device, a recommendation for performance of the waste service based on the identified increase (block 712). Then method 700 ends.

In one or more embodiments, the present disclosure provides a system for managing waste services, comprising: (i) a waste service vehicle; (ii) a memory having computer-executable instructions stored thereon; (iii) a processor located onboard a service vehicle. The processor is configured to execute the instructions to: (a) receive a service route including location information corresponding to one or more service locations; (b) monitor a location of the waste service vehicle using one or more locating devices; (c) monitor air quality using one or more air quality sensors located onboard the waste service vehicle, the one or more air quality sensors being configured to detect a plurality of airborne chemical constituents; (d) determine that the waste service vehicle is located within a threshold proximity to a first service location of the one or more service locations based on the detected location of the waste service vehicle; (e) monitor air quality associated with the first service location in response to the determination that the first service vehicle is within the threshold proximity to the first service location; (f) determine that the waste service vehicle is not currently performing a waste service based on the location of the waste service vehicle and the location information corresponding to the one or more service locations; (g) monitor air quality in response to the determination that the waste service vehicle is not currently performing a waste service; (g) generate a normalized air quality record by comparing the chemical constituents associated with the air quality associated with the first service location and the chemical constituents detected while the waste service vehicle is not currently performing a waste service; (h) receive instructions to adjust the service route of the waste service vehicle including location information corresponding to one or more locations of interest; (i) determine that the waste service vehicle is located within a threshold proximity to a first location of interest of the one or more service locations based on the detected location of the waste service vehicle and the location information corresponding to the one or more service locations; (j) determine whether a hazard is present based on the normalized air quality record and the air quality monitored by the one or more air quality sensors; and (k) transmit a report with information associated with the hazard based on the determination that the hazard is present including location information corresponding to the hazard based on the location determined by the one or more location devices and the air quality monitored by the one or more air quality sensors while the service vehicle was in proximity with the hazard.

In one or more embodiments, the processor is further configured to populate an electronic map of an environment based on the monitored air quality. In addition, the processor can be further configured to route additional service vehicles to monitor the air quality within the threshold proximity to the first location of interest. The processor can be further configured to provide a recommendation regarding handling of waste associated with the first service location based on the comparison of the chemical constituents associated with the air quality associated with the first service location and the chemical constituents detected while the waste service vehicle is not currently performing a waste service. The processor can be further configured to recognize patterns of chemical constituents detected together based on the air quality monitored by the one or more air quality sensors. The processor can be further configured to provide an alert based on the normalized air quality record and the air quality monitored by the one or more air quality sensors. The alert can include at least one of a ratio, a volume, and a weight of each category of waste material recognized in the air quality.

In one or more embodiments, the present disclosure provides a computer-implemented method for managing waste services. The method includes receiving a service route for a waste service vehicle including location information corresponding to one or more service locations. The method includes monitoring a location of the waste service vehicle using one or more locating devices. The method includes monitoring air quality using one or more air quality sensors located onboard the waste service vehicle, the one or more air quality sensors being configured to detect a plurality of airborne chemical constituents. The method includes determining that the waste service vehicle is located within a threshold proximity to a first service location of the one or more service locations based on the detected location of the waste service vehicle. The method includes monitoring air quality associated with the first service location in response to the determination that the first service vehicle is within the threshold proximity to the first service location. The method includes determining that the waste service vehicle is not currently performing a waste service based on the location of the waste service vehicle and the location information corresponding to the one or more service locations. The method includes monitoring air quality in response to the determination that the waste service vehicle is not currently performing a waste service. The method includes generating a normalized air quality record by comparing the chemical constituents associated with the air quality associated with the first service location and the chemical constituents detected while the waste service vehicle is not currently performing a waste service. The method includes receiving instructions to adjust the service route of the waste service vehicle including location information corresponding to one or more locations of interest. The method includes determining that the waste service vehicle is located within a threshold proximity to a first location of interest of the one or more service locations based on the detected location of the waste service vehicle and the location information corresponding to the one or more service locations. The method includes determining whether a hazard is present based on the normalized air quality record and the air quality monitored by the one or more air quality sensors. The method includes transmitting a report with information associated with the hazard based on the determination that the hazard is present including location information corresponding to the hazard based on the location determined by the one or more location devices and the air quality monitored by the one or more air quality sensors while the service vehicle was in proximity with the hazard.

In one or more embodiments, the method further includes populating an electronic map of an environment based on the monitored air quality. The method can further include routing additional service vehicles to monitor the air quality within the threshold proximity to the first location of interest. The method can further include providing a recommendation regarding handling of waste associated with the first service location based on the comparison of the chemical constituents associated with the air quality associated with the first service location and the chemical constituents detected while the waste service vehicle is not currently performing a waste service. The method can further include recognizing patterns of chemical constituents detected together based on the air quality monitored by the one or more air quality sensors. The method can further include providing an alert based on the normalized air quality record and the air quality monitored by the one or more air quality sensors. The alert can include at least one of a ratio, a volume, and a weight of each category of waste material recognized in the air quality.

In one or more embodiments, the present disclosure provides a non-transitory computer readable medium containing computer-executable programming instructions for a method of managing waste services. The method includes receiving a service route for a waste service vehicle including location information corresponding to one or more service locations. The method includes monitoring a location of the waste service vehicle using one or more locating devices. The method includes monitoring air quality using one or more air quality sensors located onboard the waste service vehicle, the one or more air quality sensors being configured to detect a plurality of airborne chemical constituents. The method includes determining that the waste service vehicle is located within a threshold proximity to a first service location of the one or more service locations based on the detected location of the waste service vehicle. The method includes monitoring air quality associated with the first service location in response to the determination that the first service vehicle is within the threshold proximity to the first service location. The method includes determining that the waste service vehicle is not currently performing a waste service based on the location of the waste service vehicle and the location information corresponding to the one or more service locations. The method includes monitoring air quality in response to the determination that the waste service vehicle is not currently performing a waste service. The method includes generating a normalized air quality record by comparing the chemical constituents associated with the air quality associated with the first service location and the chemical constituents detected while the waste service vehicle is not currently performing a waste service. The method includes receiving instructions to adjust the service route of the waste service vehicle including location information corresponding to one or more locations of interest. The method includes determining that the waste service vehicle is located within a threshold proximity to a first location of interest of the one or more service locations based on the detected location of the waste service vehicle and the location information corresponding to the one or more service locations. The method includes determining whether a hazard is present based on the normalized air quality record and the air quality monitored by the one or more air quality sensors. The method includes transmitting a report with information associated with the hazard based on the determination that the hazard is present including location information corresponding to the hazard based on the location determined by the one or more location devices and the air quality monitored by the one or more air quality sensors while the service vehicle was in proximity with the hazard.

In one or more embodiments, the method further includes populating an electronic map of an environment based on the monitored air quality. The method can further include routing additional service vehicles to monitor the air quality within the threshold proximity to the first location of interest. The method can further include providing a recommendation regarding handling of waste associated with the first service location based on the comparison of the chemical constituents associated with the air quality associated with the first service location and the chemical constituents detected while the waste service vehicle is not currently performing a waste service. The method can further include recognizing patterns of chemical constituents detected together based on the air quality monitored by the one or more air quality sensors. The method can further include providing an alert based on the normalized air quality record and the air quality monitored by the one or more air quality sensors. The alert can include at least one of a ratio, a volume, and a weight of each category of waste material recognized in the air quality.

It will be apparent to those skilled in the art that various modifications and variations can be made to the disclosed system. Other examples will be apparent to those skilled in the art from consideration of the specification and practice of the disclosed system. By way of non-limiting examples, magnets, buckles, buttons, or other attaching mechanisms could be used in the place of fastener surfaces. It is intended that the specification and examples be considered as illustrative only, with a true scope being indicated by the following claims and their equivalents.

What is claimed is:

1. A method comprising: monitoring at least one exterior air quality sensor that is mounted to, and exposed to air exterior to, a waste service vehicle; monitoring at least one interior air quality sensor that is mounted to the waste service vehicle and exposed to air interior to a waste hauling body that is one of carried or attached to the waste service vehicle; comparing measurement levels of exterior and interior airborne chemical constituents to one or more corresponding air quality thresholds, and in response to determining that a particular measurement level exceeds a corresponding air quality threshold, presenting a notification on a user interface device indicating the exceedance of the air quality threshold and an associated origin of one of the exterior air and the interior air; receiving over-the-air (OTA) information indicating a location of the waste service vehicle; determining that the waste service vehicle is proximate to a particular location of interest for performing a waste service operation by the waste service vehicle based on the location and an assigned route; identifying that the waste service vehicle is performing a waste service based on speed of the waste service vehicle being below a speed threshold and based on operation of an actuation mechanism of a lift arm of the waste service vehicle, the at least one exterior air quality sensor comprises an air quality sensor mounted on a forward portion of a lift arm of the waste service vehicle that lifts a waste receptacle and one: (i) loads and unloads the waste receptacle on a bed of the waste service vehicle; and (ii) dumps contents of the waste receptacle in a waste hauling body of the waste service vehicle; identifying an increase in the particular exterior measurement level that coincides with performing the waste service at the particular location of interest; and presenting, via the user interface device, a recommendation for performance of the waste service based on the identified increase.

2. The method of claim 1, further comprising: receiving, via a communication subsystem, over-the-air (OTA) information indicating a location of the waste service vehicle; and in response to determining that the particular measurement level of the exterior air exceeds the corresponding air quality threshold, transmitting, via the communication subsystem, a report that includes the particular measurement level of the exterior airborne chemical constituent and a location associated with the particular measurement level.

3. The method of claim 2, further comprising: monitoring a current speed of the waste service vehicle; comparing the current speed to a required minimum speed threshold; and enabling transmitting of the report in response to the current speed being equal to or greater than the minimum speed threshold to mitigate cross flow of interior air with exterior air.

4. The method of claim 1, further comprising identifying the associated origin of one of the exterior air and the interior air based on the corresponding one of the at least one exterior air quality sensor and the at least one interior air quality sensor having a highest measurement level for the particular airborne chemical constituent.

5. The method of claim 1, further comprising: receiving over-the-air (OTA) information indicating a location of the waste service vehicle; and in response to determining that the particular measurement level of the interior air exceeds the corresponding air quality threshold: associating a particular waste destination of more than one waste destination that is designated for waste that generates the particular airborne chemical constituent, and assigning a route to the waste service vehicle that includes the particular waste destination.

6. The method of claim 1, further comprising: monitoring an air quality sensor in a passenger compartment of the waste service vehicle for one or more airborne chemical constituents associated with a hazard to an operator of the waste service vehicle; comparing a respective measurement level of the one or more airborne chemical constituents to a corresponding hazard threshold, and in response to determining that at least one of the one measurement level exceeds a corresponding hazard threshold, presenting a hazard notification on the user interface device.

7. A waste service management system comprising: at least one exterior air quality sensor that detects a plurality of airborne chemical constituents and that is mounted to, and exposed to air exterior to, a waste service vehicle; at least one interior air quality sensor that detects a plurality of airborne chemical constituents and that is mounted to the waste service vehicle and exposed to air interior to a waste hauling body that is one of carried or attached to the waste service vehicle; a user interface display; a memory containing one or more air quality thresholds; and a controller communicatively coupled to the at least one exterior air quality sensor, the at least one interior air quality sensor, the user interface device, the memory, and a communication subsystem communicatively coupled to the controller that receives over-the-air (OTA) information indicating a location of the waste service vehicle, wherein: the at least one exterior air quality sensor comprises an air quality sensor mounted on a forward portion of a lift arm of the waste service vehicle that lifts a waste receptacle and one: (i) loads and unloads the waste receptacle on a bed of the waste service vehicle; and (ii) dumps contents of the waste receptacle in a waste hauling body of the waste service vehicle, the memory contains an assigned route including one or more locations of interest for performing a waste service operation by the waste service vehicle; and the controller comprises at least one of a communication connection with an actuation mechanism of the lift arm of the waste service vehicle and a sensor that detects operation of the actuation mechanism, and which: monitors the at least one exterior air quality sensor for exterior airborne chemical constituents, monitors the at least one interior air quality sensor for interior airborne chemical constituents, compares measurement levels of the exterior and the interior airborne chemical constituents to the one or more corresponding air quality thresholds, and in response to determining that a particular measurement level exceeds a corresponding air quality threshold, presents a notification on the user interface device indicating the exceedance of the air quality threshold and an associated origin of one of the exterior air and the interior air; determines that the waste service vehicle is proximate to a particular location of interest; identifies that the waste service vehicle is performing a waste service based on speed of the waste service vehicle being below a speed threshold and based on operation of the actuation mechanism; identifies an increase in the particular exterior measurement level that coincides with performing the waste service at the particular location of interest; and presents, via the user interface device, a recommendation for performance of the waste service based on the identified increase.

8. The waste service management system of claim 7, further comprising a communication subsystem that receives over-the-air (OTA) information indicating a location of the waste service vehicle, wherein the controller, in response to determining that the particular measurement level of the exterior air exceeds the corresponding air quality threshold, transmits, via the communication subsystem, a report that includes the particular measurement level of the exterior airborne chemical constituent and a location associated with the particular measurement level.

9. The waste service management system of claim 8, wherein the controller: monitors a current speed of the waste service vehicle; compares the current speed to a required minimum speed threshold; and enables transmitting the report in response to the current speed being equal to or greater than the minimum speed threshold to mitigate cross flow of interior air with exterior air.

10. The waste service management system of claim 7, wherein the controller identifies the associated origin of one of the exterior air and the interior air based on the corresponding one of the at least one exterior air quality sensor and the at least one interior air quality sensor having a highest measurement level for the particular airborne chemical constituent.

11. The waste service management system of claim 7, further comprising a communication subsystem that receives over-the-air (OTA) information indicating a location of the waste service vehicle, wherein the controller, in response to determining that the particular measurement level of the interior air exceeds the corresponding air quality threshold: associates a particular waste destination of more than one waste destination that is designated for waste that generates the particular airborne chemical constituent; and assigns a route to the waste service vehicle that includes the particular waste destination.

12. The waste service management system of claim 7, further comprising an air quality sensor that is positioned in a passenger compartment of the waste service vehicle and that is communicatively coupled to the controller, wherein the controller: monitors the air quality sensor in the passenger compartment for one or more airborne chemical constituents associated with a hazard to an operator of the waste service vehicle; compares a respective measurement level of the one or more airborne chemical constituents to a corresponding hazard threshold, and in response to determining that at least one of the one measurement level exceeds a corresponding hazard threshold, presents a hazard notification on the user interface device.

13. A computer program product comprising: a computer readable storage device; and program code on the computer readable storage device that when executed by a processor associated with a device, the program code enables the device to provide the functionality of: monitoring at least one exterior air quality sensor that is mounted to, and exposed to air exterior to, a waste service vehicle; monitoring at least one interior air quality sensor that is mounted to the waste service vehicle and exposed to air interior to a waste hauling body that is one of carried or attached to the waste service vehicle; comparing measurement levels of exterior and interior airborne chemical constituents to one or more corresponding air quality thresholds, and in response to determining that a particular measurement level exceeds a corresponding air quality threshold: identifying the associated origin of one of the exterior air and the interior air based on the corresponding one of the at least one exterior air quality sensor and the at least one interior air quality sensor having a highest measurement level for the particular airborne chemical constituent; receiving over-the-air (OTA) information indicating a location of the waste service vehicle; determining that the waste service vehicle is proximate to a particular location of interest for performing a waste service operation by the waste service vehicle based on the location and an assigned route; identifying that the waste service vehicle is performing a waste service based on speed of the waste service vehicle being below a speed threshold and based on operation of an actuation mechanism of a lift arm of the waste service vehicle, the at least one exterior air quality sensor comprises an air quality sensor mounted on a forward portion of a lift arm of the waste service vehicle that lifts a waste receptacle and one: (i) loads and unloads the waste receptacle on a bed of the waste service vehicle; and (ii) dumps contents of the waste receptacle in a waste hauling body of the waste service vehicle; identifying an increase in the particular exterior measurement level that coincides with performing the waste service at the particular location of interest; and presenting, via the user interface device, a recommendation for performance of the waste service based on the identified increase and presenting a notification on a user interface device indicating the exceedance of the air quality threshold and an associated origin of one of the exterior air and the interior air.

14. The computer program product of claim 13, wherein the program code enables the device to provide the functionality of: receiving, via a communication subsystem, over-the-air (OTA) information indicating a location of the waste service vehicle; and in response to determining that the particular measurement level of the exterior air exceeds the corresponding air quality threshold, transmitting, via the communication subsystem, a report that includes the particular measurement level of the exterior airborne chemical constituent and a location associated with the particular measurement level.

15. The computer program product of claim 14, wherein the program code enables the device to provide the functionality of: monitoring a current speed of the waste service vehicle; comparing the current speed to a required minimum speed threshold; and enabling transmitting of the report in response to the current speed being equal to or greater than the minimum speed threshold to mitigate cross flow of interior air with exterior air.

16. The computer program product of claim 13, wherein the program code enables the device to provide the functionality of: receiving over-the-air (OTA) information indicating a location of the waste service vehicle; and in response to determining that the particular measurement level of the interior air exceeds the corresponding air quality threshold: associating a particular waste destination of more than one waste destination that is designated for waste that generates the particular airborne chemical constituent, and assigning a route to the waste service vehicle that includes the particular waste destination.

17. The computer program product of claim 13, wherein the program code enables the device to provide the functionality of: monitoring an air quality sensor in a passenger compartment of the waste service vehicle for one or more airborne chemical constituents associated with a hazard to an operator of the waste service vehicle; comparing a respective measurement level of the one or more airborne chemical constituents to a corresponding hazard threshold, and in response to determining that at least one of the one measurement level exceeds a corresponding hazard threshold, presenting a hazard notification on the user interface device.

* * * * *